(12) United States Patent
Bagby

(10) Patent No.: US 7,392,616 B1
(45) Date of Patent: Jul. 1, 2008

(54) MODULAR FIELD PLANTING SYSTEM

(76) Inventor: Edward Arthur Bagby, 3224 SE. 9th Ave., Portland, OR (US) 97202

( * ) Notice: Subject to any disclaimer, the term of this patent is extended or adjusted under 35 U.S.C. 154(b) by 9 days.

(21) Appl. No.: 11/534,325

(22) Filed: Sep. 22, 2006

Related U.S. Application Data

(60) Provisional application No. 60/720,229, filed on Sep. 23, 2005.

(51) Int. Cl.
*A01G 27/04* (2006.01)
(52) U.S. Cl. .............. 47/65.9; 47/81; 47/66.5; 47/75; 47/33
(58) Field of Classification Search ........... 47/65.5, 47/65.9, 66.6, 66.5, 33, 66.1, 73, 75, 77, 47/86, 85, 87, 41.1, 81, 82; 206/516, 518, 206/519; 220/23.6, 23.4
See application file for complete search history.

(56) References Cited

U.S. PATENT DOCUMENTS

| | | | |
|---|---|---|---|
| 3,539,071 A | 11/1970 | Ludder | |
| 3,898,766 A * | 8/1975 | Goldstaub | 47/81 |
| 4,219,967 A | 9/1980 | Hickerson | |
| 5,022,183 A * | 6/1991 | Bohlmann | 47/86 |
| 5,927,009 A | 7/1999 | Vanwingerden | |
| 5,953,859 A | 9/1999 | Cochran et al. | |
| 6,357,179 B1 | 3/2002 | Buss | |
| 6,526,693 B2 | 3/2003 | Cochran | |
| 6,851,221 B2 * | 2/2005 | Layt et al. | 47/86 |
| 6,862,842 B2 * | 3/2005 | Mischo | 47/65.9 |
| 2004/0144026 A1 | 7/2004 | Fan | |

* cited by examiner

*Primary Examiner*—T. Nguyen
(74) *Attorney, Agent, or Firm*—Howard Natter; Natter & Natter

(57) ABSTRACT

A modular field planting system adapted for installation on a roof surface includes an arrangement of substantially identical tray members with each tray member containing two tray compartments. An array of first tray members is positioned on the roof surface with the tray members being in contiguous relationship and oriented in a first direction. A second tray member positionable in overlying relationship with respect to the first tray and rotated 90° with respect to the first direction, is nestably seated within corresponding tray compartments in each of two adjacent first tray members. A wicking material in the first tray member is placed in communication with a wicking material in the second tray member when the respective first and second tray members are seated. The first tray member is adapted to provide a reservoir for water and the second tray member is adapted to retain a growth medium whereby the wicking material provides continuous moisture migration for hydrating the growth medium.

11 Claims, 4 Drawing Sheets

MODULAR FIELD PLANTING SYSTEM

CROSS-REFERENCE TO RELATED APPLICATION

This application claims the benefit of U.S. Provisional Application Ser. No. 60/720,229 filed Sep. 23, 2005 and incorporates same herein by reference.

BACKGROUND OF THE INVENTION

1. Field of the Invention

This invention relates to plant husbandry and especially to sheet or field planting suitable for urban environments.

In particular, the invention concerns a modular field planting system suitable for a rooftop garden.

2. Description of Related Art

The integration of living plants within an urban environment can provide aesthetic, ecologic and economic benefits. For example, rooftop gardens, also known as green roofs, have been found to reduce air and noise pollution, recycle carbon dioxide, control building heating and cooling costs, absorb roof rain runoff and eliminate water pooling, prolong roof life by avoiding direct exposure to solar energy, and prevent blockage of roof drainage systems by trapping debris. Furthermore, rooftop vegetation can prevent and/or retard the spread of fire through the roof structure. Additionally, rooftop gardens can create new recreational space which is of particular significance within a crowded urban environment.

Rooftop gardens are typically designed by placing a layer of ordinary soil spread onto a roof surface. A distinct problem of this arrangement is that the structural integrity of the roof may be compromised unless the roof is reinforced for the additional deadload. Another shortcoming of rooftop gardens is that the roots from the vegetation can penetrate and damage the roof surface. Furthermore, the roof surface must be adequately waterproofed to prevent leakage as a result of drainage from the overlying soil. The aforementioned rooftop garden systems also require professional installation and maintenance and can present difficulties if there is a need to access the underlying roof surface.

Another more easily maintainable roof gardening arrangement involves freestanding planters, pots and/or containers. However, this arrangement does not readily provide continuous coverage of the roof surface. Rectangular planters may provide improved coverage however a disadvantage of rectangular planters is that the top edges of the several adjacent planters are visible and it does not create the appearance of a unitary field planting. Another problem with growing plants in pots, planters, or containers, is that the restricted space for lateral root spread can result in detrimental loss of nutrients and water necessary to sustain the plants. A further limitation is that planters and the like, placed on a roof surface are subject to over-turning due to wind forces and are particularly unstable on sloped roof surfaces. Another disadvantage of independent planters is that they must be separately watered and with shallow potting systems water retention is of particular concern.

Previous planter devices have attempted to provide a self-contained water source such as disclosed in U.S. Pat. No. 6,357,179. Although the patented device describes a water reservoir, it does not rely upon a wicking medium for delivering constant moisture. Furthermore, the patented concept does not involve an expansive growth pattern as in field planting. The wicking system described in U.S. Pat. No. 4,219,967 is intended for use with a flowerpot or planter and does not contemplate incorporation within a field planting system as in the present invention.

BRIEF SUMMARY OF THE INVENTION

Briefly, this invention concerns a field planting system for a green roof utilizing a martrix of modular tray members. The trays members are positionable in a functionally cooperative bi-level relationship with an upper tray member accommodating a growth medium and a lower tray member providing a water reservoir. A wicking material, in communication with the respective tray members hydrates the growth medium.

An aspect of this invention is that the tray members can be readily placed on a roof surface without requiring professional installation and/or maintenance.

Another aspect of this invention is that a tray member arrangement can be designed to provide continuous roof coverage.

A still further aspect of this invention is that the tray members are preferably shallow in depth, light in weight, and water impervious, for compatibility with existing roof structures.

Still another aspect of this invention is that selected tray members may be easily removed for accessing an underlying roof surface without disturbing the remaining tray members.

An additional feature of this invention is that the tray members are interlocked for positive load transfer and for resisting wind forces.

Having thus summarized the invention, it will be seen that it is a preferred object thereof to provide an improved modular field planting system of the general character described herein which is not subject to the previously mentioned limitations.

Another preferred object of this invention is to provide an improved modular field planting system defined by an interlocked network of nestable tray members.

Still another preferred object of this invention is to provide an improved modular field planting system that will maintain a substantially continuous moistening of a growth medium.

Yet another preferred object of this invention is to provide an improved modular field planting system that will not damage a supporting roof surface.

Yet still another preferred object of this invention is to provide an improved modular field planting system that is economical to manufacture, relatively simple to install, and easy to maintain.

With these ends in view, the invention finds embodiment in certain combinations of elements and arrangements of parts by which the aforementioned preferred objects and certain other objects are hereinafter attained, all as more fully described with reference to the accompanying drawings and the scope of which is more particularly pointed out herein.

BRIEF DESCRIPTION OF THE DRAWINGS

In the accompanying drawings, in which is shown an exemplary embodiment of the invention.

DETAILED DESCRIPTION OF THE INVENTION

With specific reference now to the figures in detail, it is stressed that the particulars shown are by way of example and for the purposes of illustrative discussion of the preferred embodiments of the present invention only and are presented in the cause of providing what is believed to be the most useful and readily understood description of the principles and conceptual aspects of the invention. In this regard, no attempt has been made to show aspects of the invention in more detail than is necessary for a fundamental understanding of the invention, the description taken with the drawings should make it apparent to those skilled in the art how the several forms of the invention may be embodied in practice.

Figure 1:
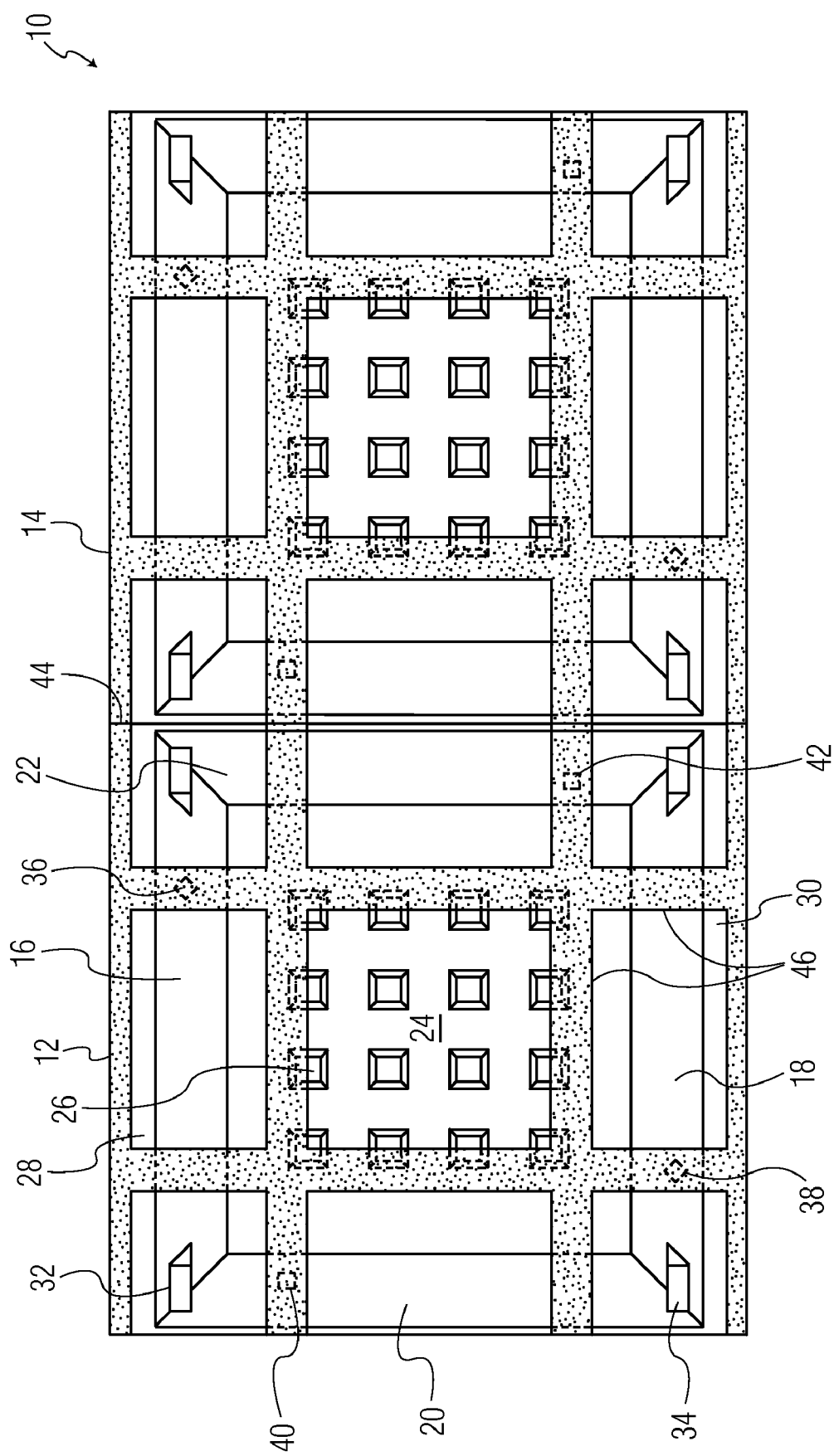
FIG. 1 is a plan view of a tray member of this invention showing two tray compartments and a pattern of wicking strips extending interiorly within the tray compartments in both a transverse and a longitudinal direction.

Referring now to FIG. 1 of the drawings there is shown a typical tray member 10 of this invention. The tray member 10 is substantially rectangular in plan view and defines two tray compartments 12, 14. In view of the congruous relationship of the tray compartments 12, 14, the following description will be made with reference to tray compartment 12, it being understood that tray compartment 14 is similarly configured. The tray compartment, 12 is defined by complimentary sets of opposed sloped sidewalls 16, 18 and 20, 22, and a bottom wall 24 spanning between the two sets of opposed sidewalls and provided with a plurality of depending legs 26. The legs 26 elevate the tray member above a support surface to provide for aeration, and when placed on a roof surface, will allow the roofing membrane to "breathe". The sloped sidewalls, 16, 18 include respective marginal flanges 28, 30. It should also be noted that the set of sidewalls 16, 18 is provided with respective wedge-shaped braces 32, 34, the function of which will be described hereinafter. The sidewalls 16, 18 also include respective nib members 36, 38 and the sidewalls 20, 22 include apertures 40, 42 that register with the nib members 36, 38 when the tray members 10 are assembled in a functional mode.

Further with regard to the fabrication of the tray member 10, a score-line 44 is preferably incorporated within the manufacturing process between the tray compartments 12, 14 so as to provide frangibility as needed, for separation of the respective tray compartments 12, 14.

By way of example, the tray member 10 may be fabricated of a light-weight, water-impervious, PVC plastic or equivalent material, and may be vacuum-formed and/or injection molded as an integral unit. It should also be understood that the designation "tray member" is intended to encompass a range of open receptacles. Although the tray member 10 is shown and described as being substantially rectangular and as having dual compartments, 12, 14, a tray member 10 having an alternative geometric shape and an alternative number of tray compartments is within the scope of this invention.

As shown in FIG. 1, the tray compartments 12, 14 are provided with an orthogonal pattern of wicking strips 46 extending in a transverse and in a longitudinal direction. The wicking strips 46 are placed along the bottom wall 24, up the respective sidewalls 16, 18, and 20, 22 and extends over the marginal flanges 28, 30 slightly beyond the respective edge of the flanges 28, 30 and slightly over the top edge of the sidewalls 20, 22. It should also be noted that the wicking strips 46 also extends over the respective nib members 36, 38 and the respective apertures, 40, 42. By way of example, the wicking strips 46 can be made of an absorbent fabric such as a nonwoven, needle-punched polyester material or the like that will provide for migration of moisture by capillary action. Additionally, in lieu of the wicking strips 46, a continuous sheet of a wicking material may be utilized.

Figure 2:
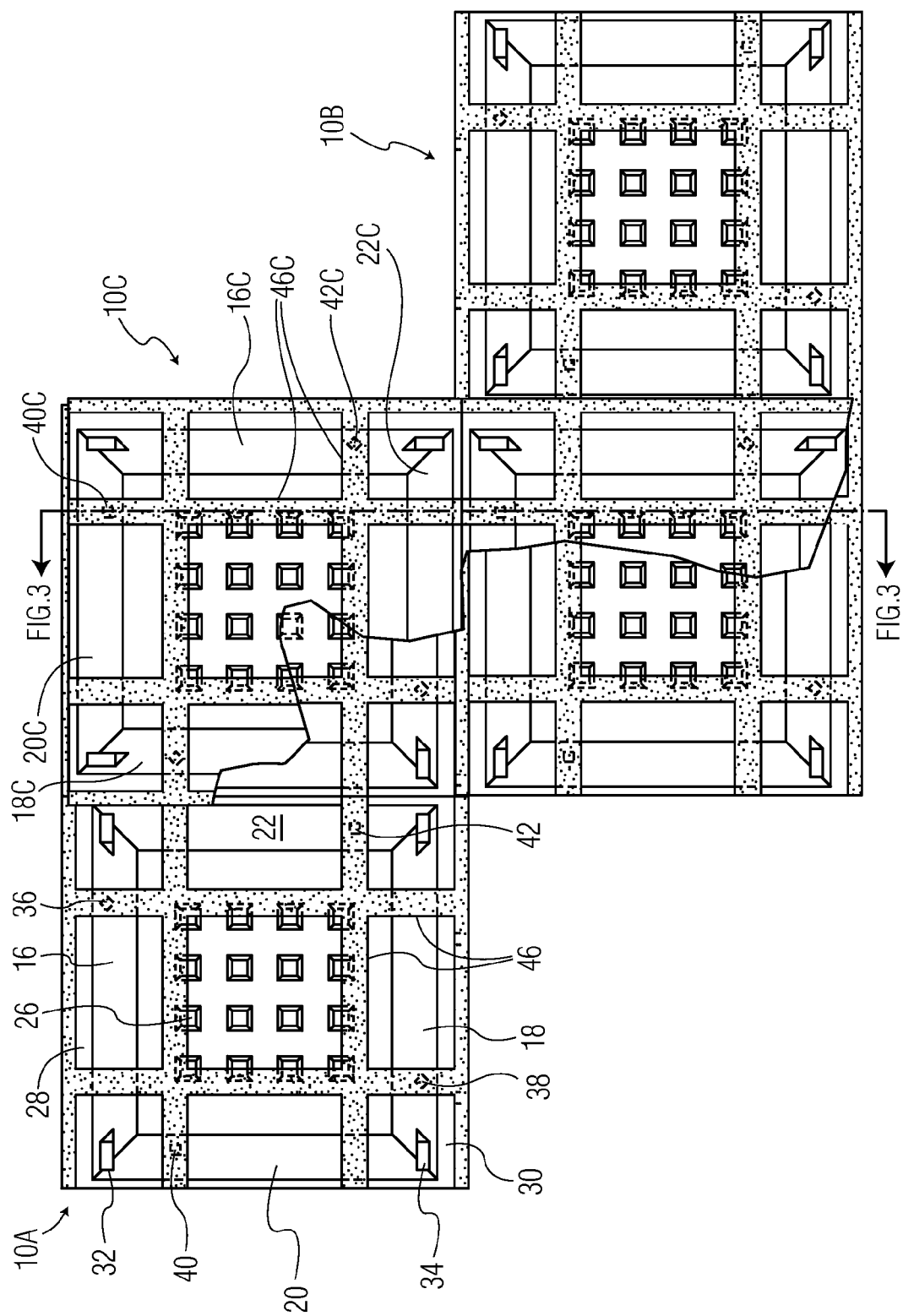
FIG. 2 is a plan view showing two tray members and an overlying third tray member, with a portion cut away for illustrative purposes, nestably engaged within the two tray members.
Figure 3:
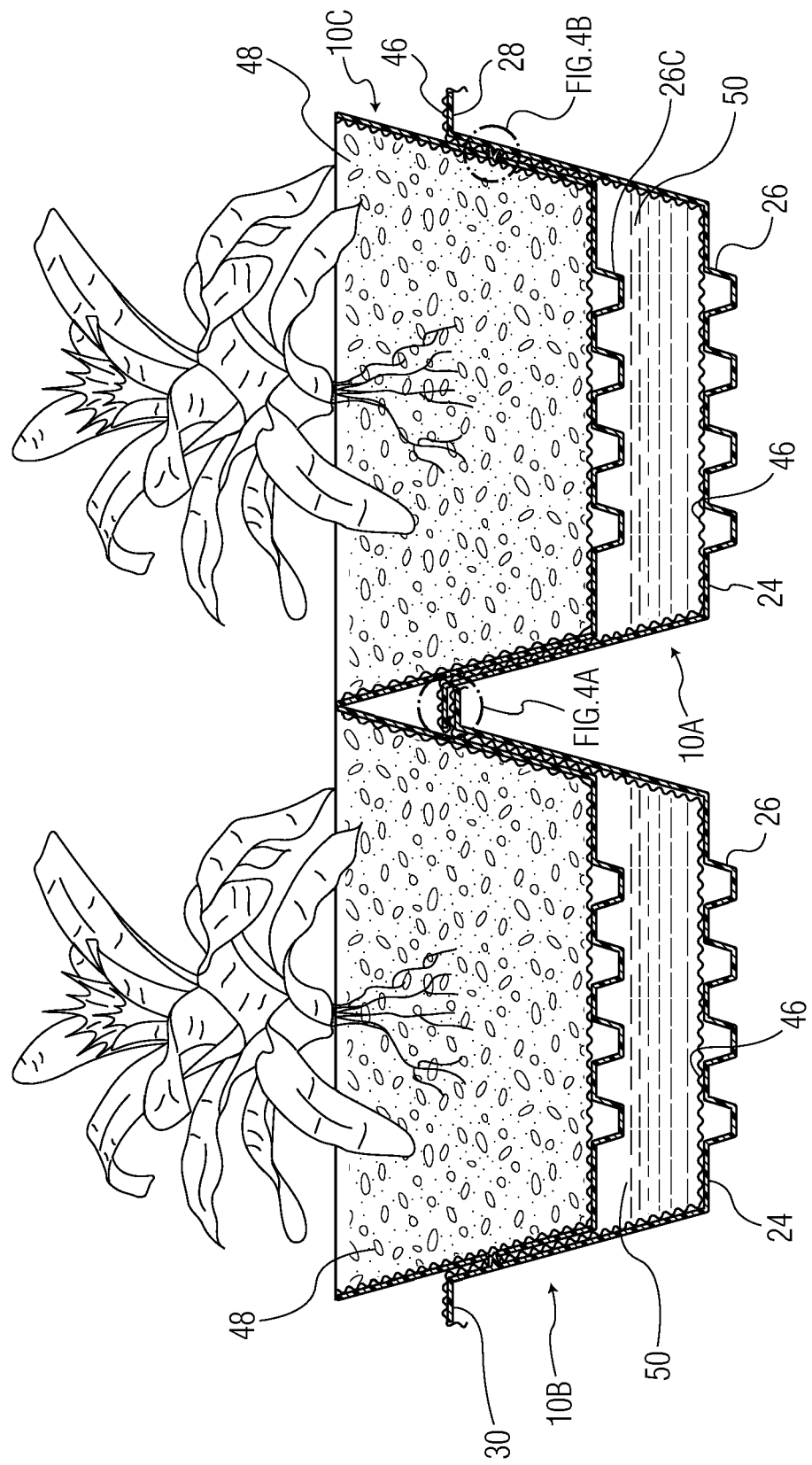
FIG. 3 is a sectional view taken substantially along line 3-3 of FIG. 2 illustrating the nestable engagement of the tray members.

With regard to the operational assembly of the tray members for providing field planting coverage of a surface, there is shown in FIG. 2 two adjacent tray members designated 10A, 10B, lying in one direction (e.g. on a roof surface) with the marginal flanges 28, 30 overlapping. An upper tray member 10C, has been rotated 90° with respect to direction of the tray members 10A, 10B, to register the complimentary sets of opposed sidewalls and is nestably seated within corresponding tray compartments in each of the tray members 10A, 10B as shown in FIGS. 2 and 3. For the purposes of clarity the reference numerals as applied to the corresponding elements in the tray member designated 10C include the suffix "c". It should be noted that when the tray member 10C is fully seated, the nib members 36, 38 of tray member 10A will register with the respective apertures 40c and 42c (not shown) for snap-fit or equivalent engagement. Furthermore the wicking strips 46 extending from the tray members 10A, 10B are urged, by the respective nib member 36 and 38, through the apertures 40c and 42c and into contact with the wicking strips 46 of the tray member 10C as shown in detail in FIG. 4B.

It should also be observed that the distance dimension between the sidewalls 16, 18 is slightly greater than the distance dimension between the sidewalls 20, 22. This configuration will limit the vertical displacement of the overlying tray member 10C into the lower tray members 10A, 10B to thus define a chamber for retaining water. The braces 32, 34 in the tray member 10A are used to hold the sidewalls 20c, 22c, apart from the sidewalls 16, 18 in the tray member 10A during nestable seating and also provide stability and help to align the apertures 40c, 42c, with the nib members 36, 38, when the tray members 10A, 10B, 10C are nested as shown in FIGS. 2 and 3.

Although this preferred embodiment was described using substantially identical tray members 10, a similar interaction between respective tray members is achievable using a combination of variant tray members. For example, an upper tray member may be shallower in depth than the lower tray member yet nestably engageable with the lower tray member.

It is also considered within the scope of this invention to configure the tray compartments with substantially vertical, rather than sloped sidewalls, and to limit vertical displacement of the upper tray member within the lower tray member by providing a "stop" in the form of an offset or "step" in the sidewall of either or both tray compartments.

It should be obvious that to accomplish a field planting another array of tray members 10 can be placed adjacent to the first set of engaged tray members to form a grid for providing continuous surface coverage. At the edging along the periphery of the field planting, the tray members 10 may be separated along the score-line 44 to provide a uniform boundary.

In accordance with the purpose of this invention, the tray member 10A is provided with a growth medium 48, preferably having high absorbency and water retention characteristic for supporting vegetation (e.g. grass, plants, shrubs). Typically, the growth medium 48 can consist of non-organic mineral components and/or artificial soil such as vermiculite or perlite and preferably, should be engineered to weigh less than the weight of conventional soil. The growth medium 48, preferably extends above the upper edge of the sidewalls 16, 18 and 20, 22.

Further in accordance with this invention, the tray members 10A, 10B, will function as a reservoir for supplying hydration to the growth medium 48.

Figure 4A:
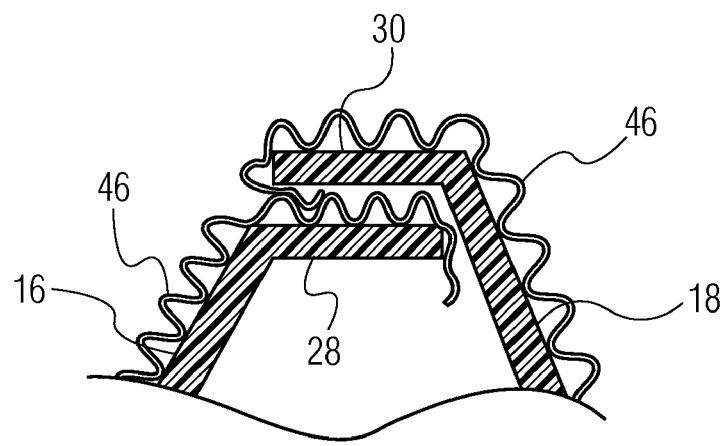
FIG. 4A is a sectional view, to an enlarged scale, of a portion of a marginal flange of two adjacent tray members, corresponding to the area identified in FIG. 3, showing the contiguous relationship of the wicking strips.
Figure 4B:
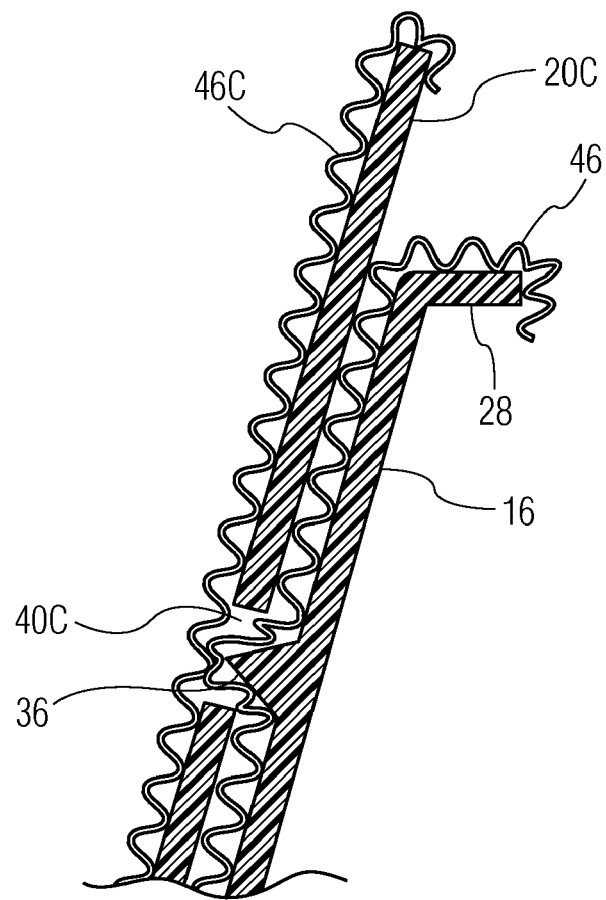
FIG. 4B is a sectional view, to an enlarged scale, of a portion of the nested tray members, corresponding to the area identified in FIG. 3, showing the juncture of the wicking strips between the respective tray members.

It should also be apparent that a quantity of water 50 placed in the tray members 10A, 10B will migrate via the wicking strips 46, in a generally vertical direction, to the tray member 10C and through the growth medium 48. Additionally, rainwater collected in the upper tray member 10C will be transmitted via the wicking strips 46, to the lower tray members 10A, 10B. This prevents oversaturation of the growth medium 48 which can be damaging to the vegetation roots. It should be further noted that the water 50 in the tray members 10A, 10B will migrate, in a generally horizontal direction, to adjacent tray members via the wicking strips 46 of adjacent tray members in contact along the marginal flange 28, 30 as shown in FIG. 4A. In this regard, it should be observed that the portion of the wicking strip 46 that extends beyond the edge of the flanges 28, 30 is wrapped under the upper of the mating flanges 28, 30 to place the wicking strip 46 on the respective flanges 28, 30 in contact. The portion of the wicking strips 46 extending above the sidewalls 20, 22 overlap at the respective confronting edges for water migration and for preventing the growth medium 48 from falling between the tray members 10A, 10B. The horizontal water migration will reduce the need to water each tray member. Also designated upper tray members can be filled with gravel, rather than a growth medium 48, to function as a rainwater collector for replenishing the water 50 in the lower tray member.

Note also that apertures 40, 42 in the tray members 10A, 10B will provide overflow protection; when the water 50 reaches the level of the apertures, 40, 42 it will flow out of the tray members 10A, 10B.

It should thus be seen that there is provided an improved modular field planting system which achieves the various preferred objects of this invention and which is well adapted to meet conditions of practical use. Since other various possible embodiments might be made of the present invention or modifications might be made to the exemplary embodiments set forth above, it is to be understood that all materials shown and described with reference to the accompanying drawings are to be interpreted as illustrative and not in a limiting sense.

Having thus described the invention, there is claimed as new and desired to be secured by Letters Patent:

1. A modular field planting system adapted for installation on a roof surface comprising a plurality of substantially identical tray members, each of said tray members defining at least two tray compartments, a first array of at least two tray members in contiguous relationship being positionable on the roof surface in a first orientation, a second array of at least one tray member being positionable in a second orientation with respect to the first array of tray members, the respective tray compartments of said second array of tray members being nestably seatable within corresponding tray compartments in each of two of the contiguous tray members, said tray compartments of said first array of tray members being adapted to provide a reservoir for water, said tray compartments of the second array of tray members being adapted to provide a receptacle for a growth medium, a wicking material within said respective tray compartments of the first and the second array of tray members, said wicking material in said tray compartment of said first array of tray members being in contact with the wicking material in said tray compartment of said second array of tray members when the respective tray compartments are nestably seated to provide moisture migration for hydrating the growth medium.

2. A modular field planting system as claimed in claim 1 wherein the respective tray compartments include a bottom wall, a first set of opposed sidewalls, a second set of opposed sidewalls, a marginal flange extending along an edge of the first set of opposed sidewalls, said wicking material extending along the bottom wall, the first and second sets of opposed sidewalls and the marginal flange with the wicking material along the marginal flange of contiguous tray compartments being in contact for moisture migration between adjacent tray members.

3. A modular field planting system as claimed in claim 2 wherein the first set of opposed sidewalls defines at least one nib member and the second set of opposed sidewalls defines at least one corresponding aperture, said nib member being registrable with said aperture when said tray compartment of the second tray member is seated within the tray compartment of said first tray member.

4. A modular field planting system as claimed in claim 3 wherein said wicking material extends over the respective nib member and the aperture with said nib member of a first tray compartment urging the wicking material within the first tray compartment through the aperture of the second tray compartment and into contact with the wicking material in the second tray compartment.

5. A modular field planting system as claimed in claim 3 wherein the first set of opposed sidewalls defines plural nib members and the second set of opposed sidewalls defines plural corresponding apertures.

6. A modular field planting system as claimed in claim 3 wherein the nib member is adapted for snap-fit engagement within the registered aperture.

7. A modular field planting system as claimed in claim 2 wherein the distance dimension between the first set of opposed sidewalls is greater than the distance dimension between the second set of opposed sidewalls for a limiting vertical displacement of the tray compartment of the second tray member when seated within the tray compartment of the first tray member to define a chamber for retaining water within the tray compartment of the first tray member.

8. A modular field plating system as claimed in claim 2 wherein the bottom wall defines a plurality of depending legs for elevating the tray member above the roof surface.

9. A modular field plating system as claimed in claim 2 wherein the first set of opposed sidewalls includes at least one brace member, said brace member being adapted to engage the second set of opposed sidewalls of an overlying tray compartment for stabilizing the seated tray compartment.

10. A modular field planting system as claimed in claim 1 wherein the first array of tray members defines a first plane, the second array of tray members defines another plane parallel to the first plane with the second orientation being disposed 90° with respect to the first orientation.

11. A modular field planting system adapted for installation on a planar surface comprising a plurality of tray members, each of said tray members defining at least one tray compartment, a first array of at least one tray member being positionable on the planar surface in a first orientation, a second array of at least one tray member being positionable in a second orientation with respect to the first array, the tray compartment of said second array being engageable within the tray compartment in the first array, said tray compartment of the first array being adapted to provide a reservoir for water, said tray compartment of the second array being adapted to provide a receptacle for a growth medium, a wicking material within said respective tray compartments of the first and the second array, said wicking material in said tray compartment of said first array being in contact with said wicking material in said tray compartment of said second array when the respective tray compartments are engaged to provide moisture migration for hydrating the growth medium.

* * * * *